(12) United States Patent
Hasegawa et al.

(10) Patent No.: US 6,633,724 B1
(45) Date of Patent: Oct. 14, 2003

(54) REALTIME DATA RECORDING METHOD

(75) Inventors: Tsukasa Hasegawa, Hiratsuka (JP); Masahiro Kageyama, Hachiouji (JP); Tamotsu Ito, Ayase (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/257,494

(22) Filed: Feb. 25, 1999

(30) Foreign Application Priority Data

Feb. 25, 1998 (JP) ............................................ 10-042710

(51) Int. Cl.⁷ .............................................. H04N 5/911
(52) U.S. Cl. ........................................ 386/113; 386/125
(58) Field of Search ............................... 386/45, 94–95, 386/125–126, 113; 369/13.11, 47.14, 53.15, 53.16, 52.17, 53.2, 53.31, 53.37; 348/231.1; 707/205; 714/8, 16

(56) References Cited

U.S. PATENT DOCUMENTS

| | | | |
|---|---|---|---|
| 5,241,672 A | * 8/1993 | Slomcenski et al. | ......... 707/205 |
| 5,787,445 A | * 7/1998 | Daberko | ..................... 707/205 |
| 5,799,212 A | * 8/1998 | Ohmori | ................... 369/13.11 |
| 6,223,302 B1 | * 4/2001 | Nakamura et al. | ............. 714/8 |
| 6,249,641 B1 | * 6/2001 | Yokota | ......................... 386/94 |
| 6,295,086 B1 | * 9/2001 | Fukushima et al. | ......... 386/125 |
| 6,330,028 B1 | * 12/2001 | Oie et al. | ................ 348/231.1 |

FOREIGN PATENT DOCUMENTS

| | | |
|---|---|---|
| JP | 09167447 | 6/1997 |
| JP | 10177769 | 6/1998 |

\* cited by examiner

*Primary Examiner*—Thai Tran
*Assistant Examiner*—Christopher Onuaku
(74) *Attorney, Agent, or Firm*—Antonelli, Terry, Stout & Kraus, LLP

(57) ABSTRACT

A realtime data recording method allows recovery of recorded file data upon occurrence of a fault, for use as a readable file. Prior to recording, initial management data are generated such that the entire area on a recording medium 1 is reflected as a recording range. After the initial management data has been recorded, data recording is started. During the recording, a writing status of the recording medium (or apparatus) is set as in-writing status, and real-time sector information generated in parallel to data recording is recorded in a non-volatile memory for management of a recording status. Upon restarting after a recording fault, the in-writing status of the recording medium 1 is read to see if the medium has been set open, and inconsistency between the recording information of the sector information and the in-writing status recording information is detected. Correct management data is recorded and re-recorded onto the recording medium.

4 Claims, 6 Drawing Sheets

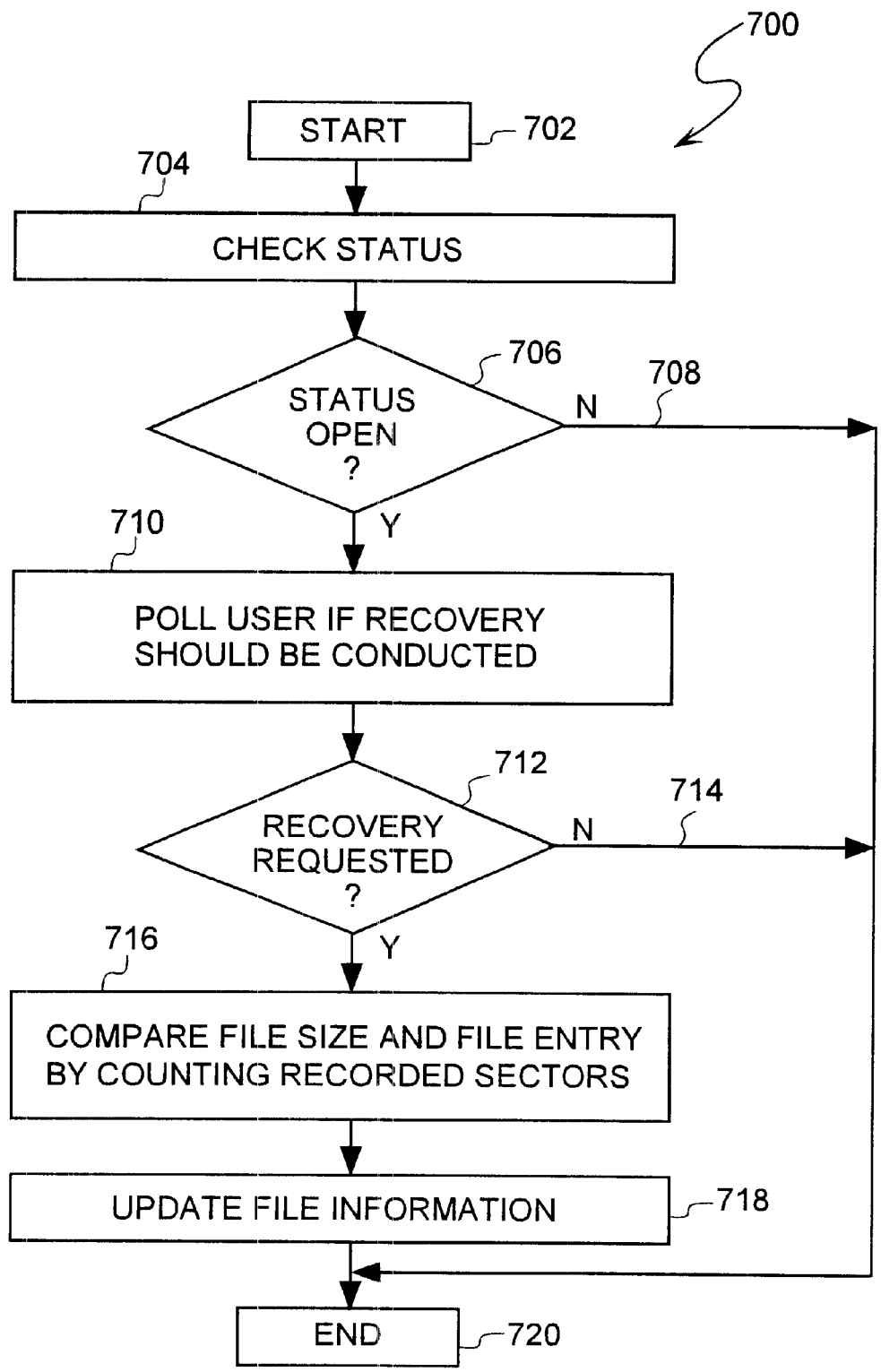

REALTIME DATA RECORDING METHOD

FIELD

The present invention relates to a realtime data recording method and apparatus, and more particularly, to a realtime data recording method and apparatus having an arrangement allowing file data which was recorded without corresponding updated management data (e.g., due to an apparatus fault), to be accessed and management data related thereto to be updated, and is especially useful for a camcorder recording system using an optical disk, a magneto-optical disk or the like.

BACKGROUND

Recently, with popularization of computers, an optical disk, a magnetic disk, a magneto-optical disk and the like have become popular and miniaturized, and further, with development of image-signal digital processing techniques, "compression-encoding" processing can now be performed with respect to image data without serious degradation of image quality. One example implementation of use of such image processing techniques is a camcorder having one of the above-mentioned mass-storage arrangements. In the magnetic disk, the optical disk, the magneto-optical disk and the like, data such as the aforementioned image data can be stored thereon, and such data may be managed as files. Although practice of the present invention is not limited thereto, the following discussions will focus on examples using a magneto-optical disk to record image (e.g., video) data. However, it should be remembered that such focus is made only for the sake of brevity/conciseness of this disclosure.

For file management, files may be arranged according to a logical structure having a management data and a file data part, with a predetermined number of bytes constituting a sector and a predetermined number of sectors corresponding to the logical structure. A command of recording, reproduction or deletion of a file may be inputted and conducted with respect to the magneto-optical disk. When the command of recording, reproduction or deletion is inputted, data is recorded, reproduced or deleted with respect to a file area of the disk.

With regard to problems to be solved by the invention, in a disadvantageous file management arrangement, when data is to be recorded as a file, file data is recorded in a data recording area, and then management data is recorded in corresponding management (e.g., directory and file name/size) area on the disk. More particularly, attention is directed to the recording operation flowchart 500 of FIG. 5, wherein after a start block 502, flow moves to a block 504 where a predetermined amount of sectors of file data are recorded onto a recording medium. At a block 506, it is determined whether recording of file data onto the recording medium has been finished, and if not, flow moves through loop 508 and again to block 504 to conduct additional recording of file data. Once it is determined within block 506 that recording of file data has been finished, flow moves to a block 510 wherein a bitmap of recorded sectors on the recording medium is updated, then to a block 512 wherein file management data on the recording medium is updated, and finally, flow is ended at an end block 514. The bitmap may have bits in one-to-one correspondence to available sectors on the recording medium, and may have a first logical value (e.g., a logical "1") written within bitmap bits where data has been written into a corresponding recording medium sector, or a second logical value (e.g., a logical "0") written within bits where data has not been written into a corresponding sector.

In the above recording method, for example, if a disturbance (e.g., a fault of power loss, a mechanical shock due to droppage, vibration) occurs in the apparatus before the blocks 510 or 512 are performed, file management data on the recording medium will not be updated to match the file data which has been newly written, and accordingly, the recording medium's file management information and file data will be mismatched, and a data and/or system error may occur if the faulted recording medium is attempted to be read/reproduced. Such problem is especially likely to occur in image recording apparatuses, where the above "compression encoding" processing may be performed, for example, for long term processing/recording for a video image on a tape capable of holding a video of about 80 minutes long. That is, since file data with respect to the video image is recorded for substantially long bursts of time (e.g., 5–10 minutes) with a camcorder before the management data is updated, if a disturbance occurs (e.g., power loss, mechanical shock, vibration, etc), a substantial amount of recorded file data may be lost, i.e., lost because of non-updated/mismatched management data.

As further limitations which may contribute to the fault potential, physical and processing limitations of the recording apparatus and/or the compression/recording processes may prevent the management data from being updated more frequently. More particularly, the file data area and the management data area on the recording medium may be physically separated from one another, such that a substantial amount of time may be required to move a recording head from one area to the other, preform recordation, and then move back again. In direct opposition, image data compression and recording may be an extremely time/processing intensive operation requiring substantially uninterrupted use of the recording head for recording at the file data area, i.e., time/processing requirements may be so intensive that there may be insufficient time to move the recording head from the file data area to the management data area, perform management data updating, and then move the recording head back to the file data area, without suffering substantial image data loss.

As a result of all of the foregoing, the above-described problem that data being recorded upon occurrence of fault cannot be read is highlighted.

Art of possible interest with respect to the present invention includes Japanese Patent Application Laid-Open No. 9-167447. Such technique provides an arrangement which allows determination of the existence/absence of a recording abnormality. However, with such technique, content of data management information cannot be read, and further, recorded data recorded before the abnormality cannot be recovered as a readable file.

SUMMARY

Accordingly, a first embodiment of the present invention is directed to a data recording method for realtime recording a file onto a recording medium, including the steps of: before recording of the file, first generating management data pertaining to a realtime recording of the file to be recorded, and non-volatilely storing the management data; next, recording file data for the file on the recording medium; then, updating the management data to reflect an actual status of recording the file data, and non-volatilely storing the updated management data.

Another embodiment is directed to a realtime data recording method for recording data in a realtime manner on a random-accessible data recording medium, including: before recording of file data, generating initial management data for the file data to be recorded, then recording the initial management data on the data recording medium, and starting recording of the file data on the data recording medium; during the recording of the file data on the data recording medium, at least intermittently generating realtime management data corresponding substantially to a realtime the file data recorded on the data recording medium, and recording the realtime management data in a non-volatile recording medium different from the data recording medium; and upon restarting a use of the data recording medium after occurrence of a fault, reading the initial management data and detecting the fault, and using the realtime management data from the non-volatile recording medium to generate updated management data, and recording the undated management data onto the data recording medium.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure hereof this invention. While the foregoing and following written and illustrated disclosure focuses on disclosing example embodiments of the invention, it should be clearly understood that the same is by way of illustration and example only and is not to be taken by way of limitation, the spirit and scope of the present invention being limited only by the terms of the appended claims.

The following represents brief descriptions of the drawings, wherein:

FIG. 7 is directed to an example recovery operation flowchart 700 according to one example embodiment of the present invention.

DETAILED DESCRIPTION

Figure 1:
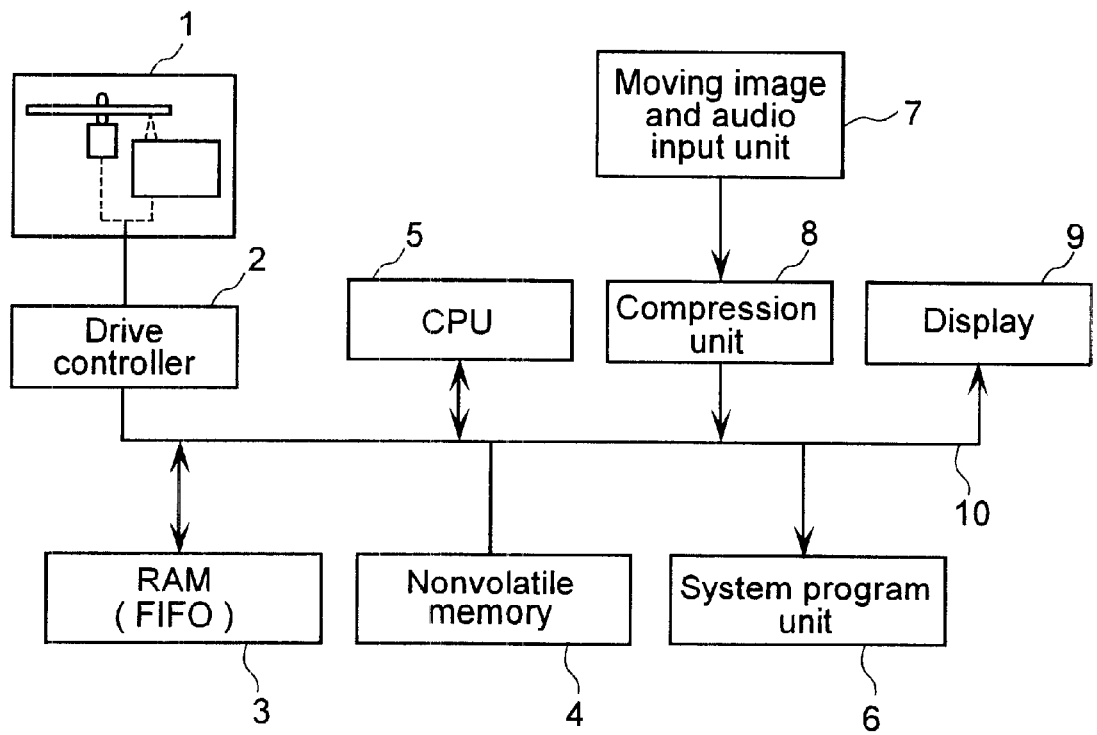
FIG. 1 illustrates an example recording apparatus using an example realtime data recording method according to one example of the present invention.

Before beginning a detailed description of the subject invention, mention of the following is in order. When appropriate, like reference numerals and characters are used to designate identical, corresponding or similar components in differing figure drawings. Further, in the detailed description to follow, exemplary values (e.g., sizes, models, values, ranges) are given, although the present invention is not limited to the same. As a final note, power and other well known connections within the FIGS. are not shown for simplicity of illustration and discussion, as so as not to obscure the invention.

Figure 2:
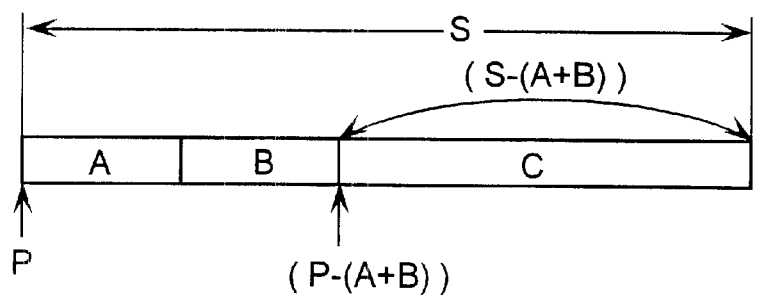
FIG. 2 illustrates an example explanatory view of the disk space in the recording apparatus in FIG. 1.
Figure 3:
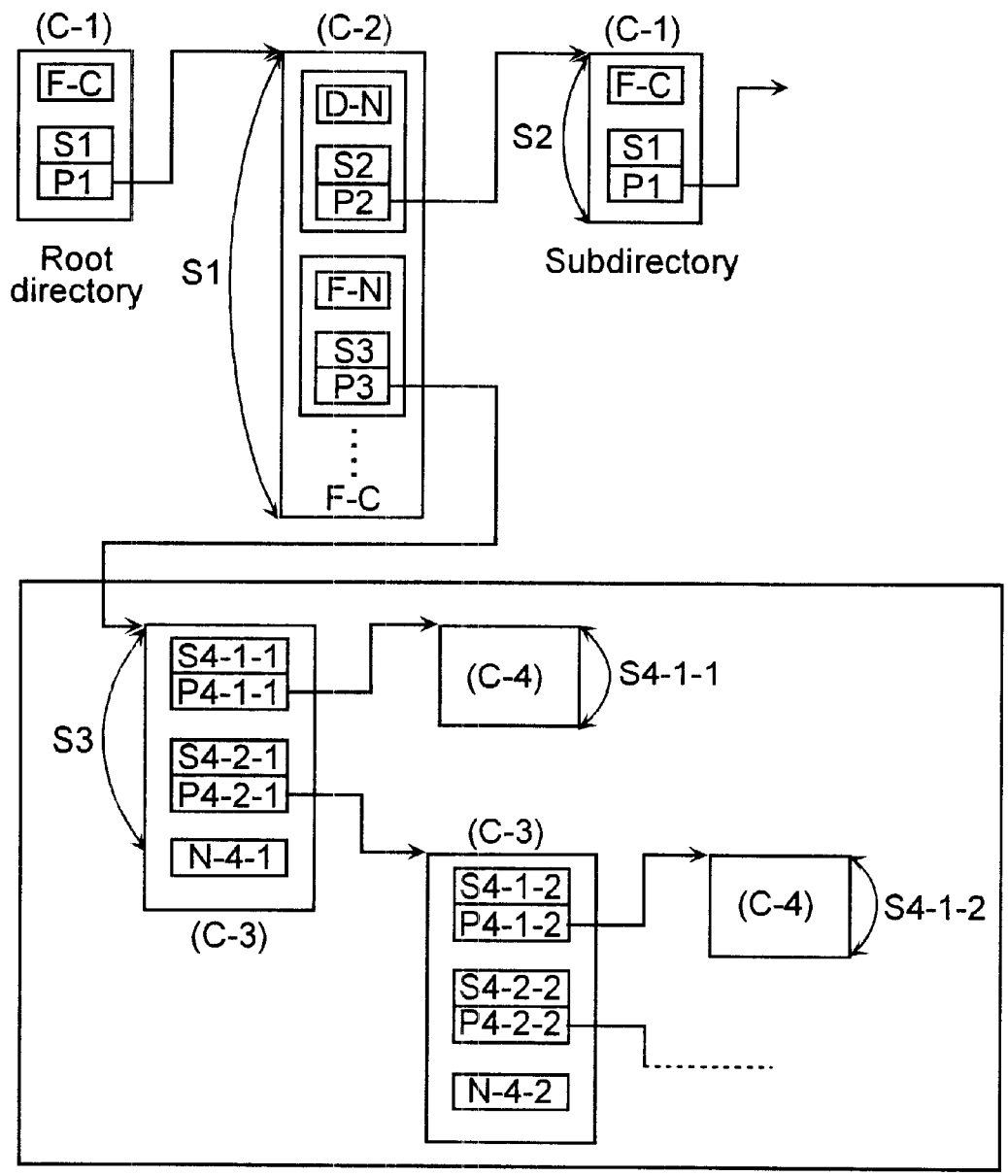
FIG. 3 illustrates an example explanatory view of the hierarchical file structure in the disk space in FIG. 2.
Figure 4:
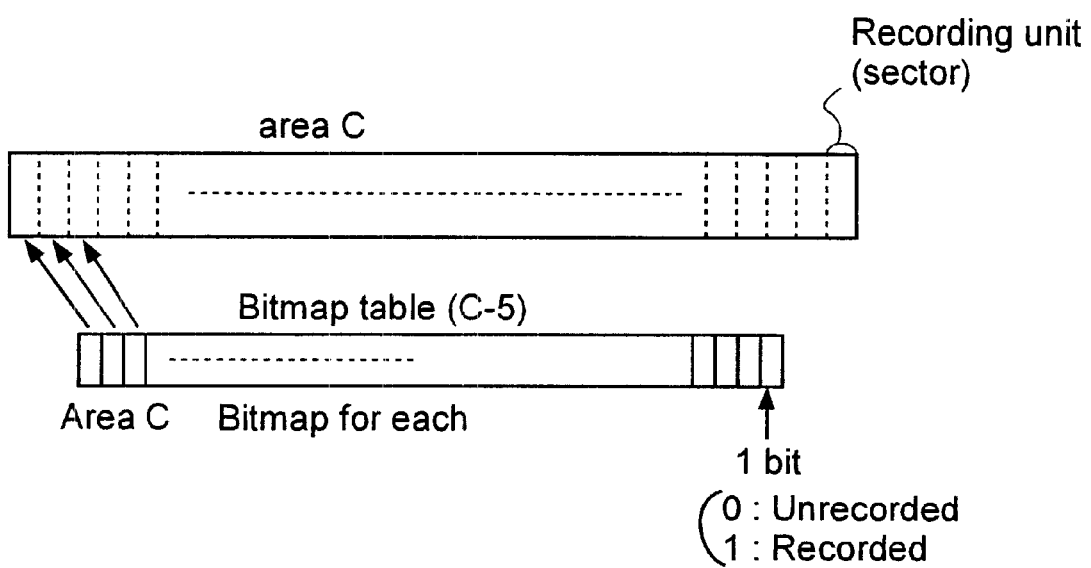
FIG. 4 illustrates an example explanatory view of the file structure in FIG. 3 and an example corresponding bitmap table.
Figure 5:
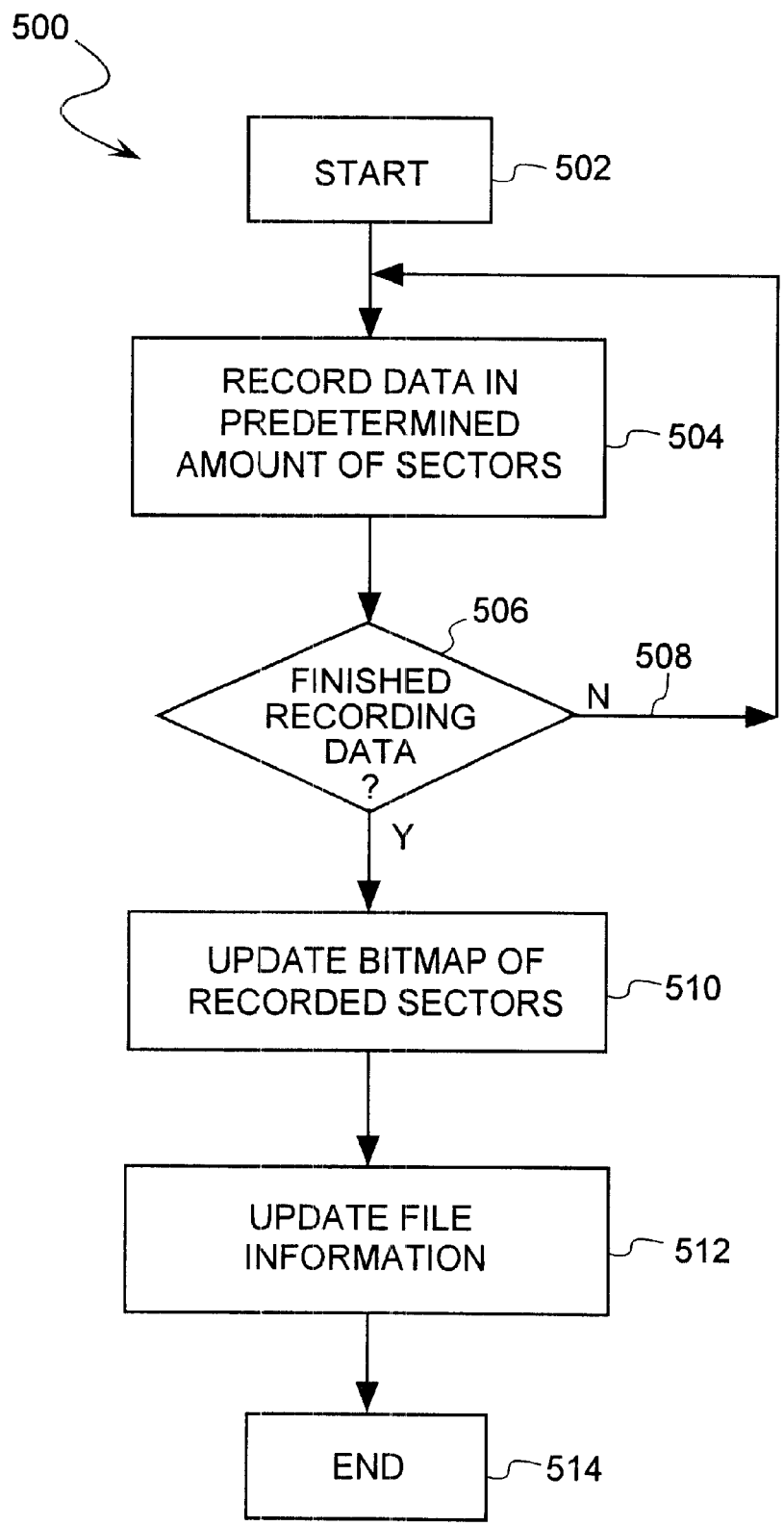
FIG. 5 is directed to an example recording operation flowchart 500 for background discussion.
Figure 6:
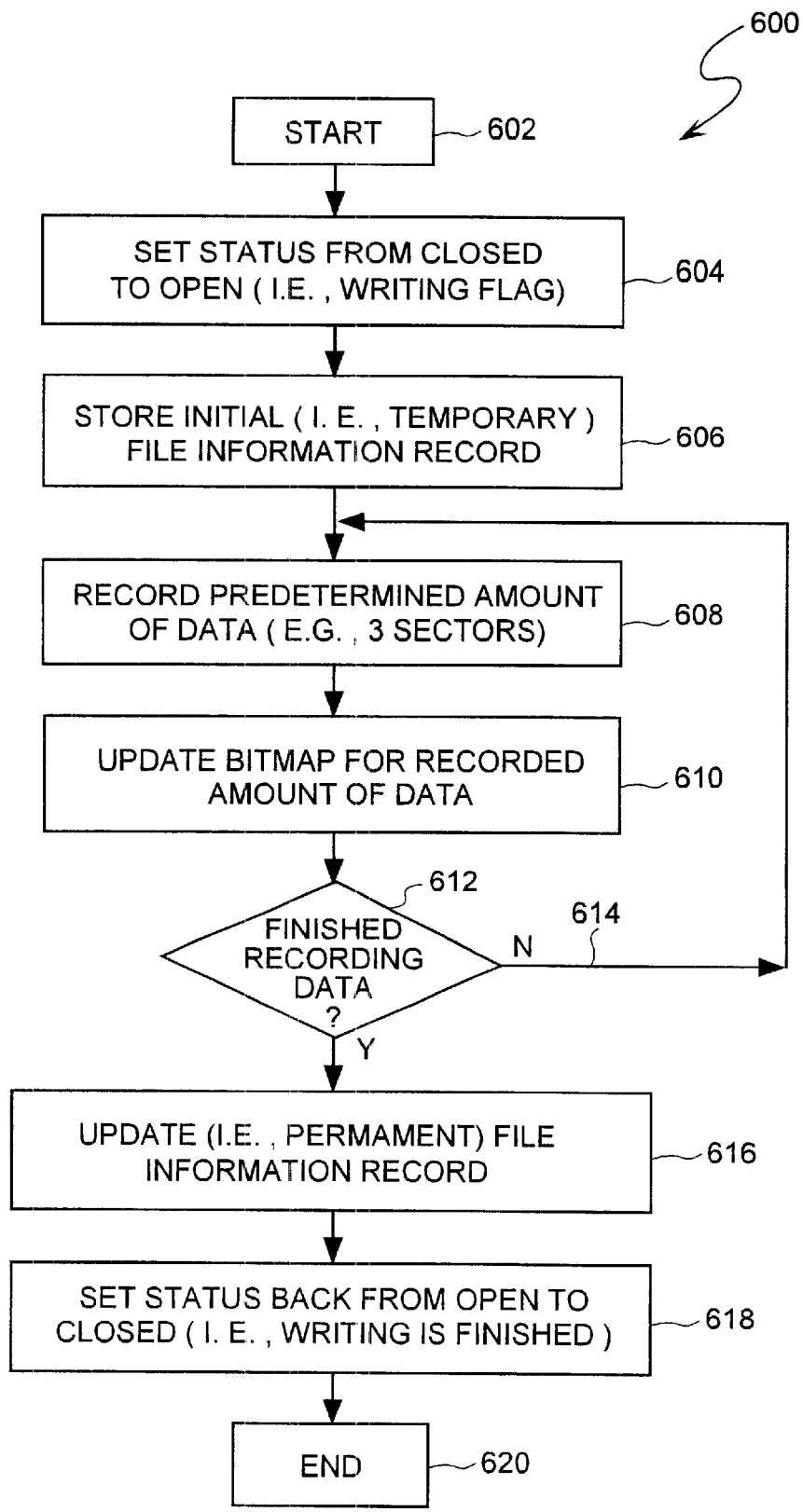
FIG. 6 is directed to an example recording operation flowchart 600 according to one example embodiment of the present invention.

Turning now to description, an example realtime data recording method and apparatus according to one working example of the present invention will be described. More particularly, although practice of the present invention is not limited thereto, an embodiment using a magneto-optical disk apparatus as a representative example will be described with reference to FIGS. 1 to 4 and 6 to 7. More particularly: FIG. 1 shows an example recording apparatus for effecting the example realtime data recording method according to the example of the present invention; FIG. 2 is an explanatory view of an example disk space in the recording apparatus in FIG. 1; FIG. 3 is an explanatory view of an example hierarchical file structure in the disk space in FIG. 2; and, FIG. 4 is an explanatory view of the example file structure in FIG. 3 and an example corresponding bitmap table. FIGS. 6 and 7 are discussed ahead.

Turning further to the working example, first a schematic construction of the example recording apparatus will be described. In FIG. 1, shown is a data recording arrangement 1 such as a magneto-optical disk, on which management data and compressed data are both recorded. A drive controller 2 records and reproduces data with respect to the recording medium 1. One of the data recording arrangement 1 and drive controller 2 comprise a spindle motor for rotating the magneto-optical disk, an optical pickup for emitting laser light to the magneto-optical disk for reading/writing purposes, a servo circuit, a modulation circuit for modulating a recording signal, and the like.

A RAM 3 is arranged to operate as a FIFO (First In First Out) memory having a buffer function with respect to data supplied to/from the recording medium 1, and may have sufficient capacity so as to allow a processor unit (described ahead) to temporarily perform other operations while the buffer unloading/loading to/from the recording medium continues to operate in parallel. A non-volatile memory 4 receives power supplied from a non-interruptible power source, or otherwise is able to function as a non-volatile memory (e.g., a FLASH memory) without uninterrupted power source considerations. Even when the recording apparatus experiences a fault so as to prematurely end a recording operation before management data on the recording medium is updated, useful recovery data (as described ahead) is stored in the memory 4 so as to enable recovery of most, if not all, newly recorded file data.

A processor unit (PU) 5 executes various processings in accordance with a program stored in a system program unit, i.e., a ROM 6. A moving image & audio input unit 7 is one of a camera, an image scanner, an A/D converter and the like, for inputting moving image and audio digital data. A compression unit 8 performs data compression of such moving image and audio digital data according to a predetermined compression method, for example, the Moving Picture Experts Group (MPEG) or MPEG 2 standard. A display 9 displays data, whereas a bus 10 is used to transport signals and data between the various components.

In continuing discussion, an example file management format in a disk space in the recording apparatus, as used in the present invention, will be described with reference to FIGS. 2 and 3. As shown in these figures, the disk spaces (e.g., 2.6 Gbytes) may be divided into areas A, B and C. The area A may be used for recording some (e.g., first) predetermined management data, e.g., a recording format of a recording medium and a recording range of user data (i.e., recording medium information or volume attributes/sizes such as a recording size S-A, a recording start position P-A, respective start points in a recording table in a user area to be described below, and the like). The area B may be used for recording some additional (i.e., second) management information, including information on the user area such as a number of files N-B recorded in the user area, a total recording size S-B, and a recording status F-B of the recording medium (or apparatus).

With regard to a recording status indicator, as one example, a predetermined writing status bit may be set/reset to indicate that the recording medium has been set/reset into a writing/non-writing status, e.g., such recording status bit may use a first logical value (e.g., a logical "1") to indicate that a writing operation has been begun with respect to the recording medium (i.e., indicate that the recording medium is "open" or set to a writing status), and may use a second logical value (e.g., a logical "0") to indicate that a writing operation to the recording medium has been completed (i.e., indicate that the recording medium is "closed" or set to a non-writing status). As another example, a first (e.g., multi-bit) identification code indicative of pre-recording status may be recorded, then the data is recorded on the recording medium, and then the first identification code may be replaced by a second (e.g., multi-bit) identification code indicative of post-recording status.

Returning to further discussion of the recording medium, the area C may be a user area, and may be used to store, for example, space management information, file directories, file bodies, etc. If S is taken as a disk space size, the recording size of the area C is represented by [S−(A+B)], and may be, for example, 2.3 Gbytes. In a related manner, if P is taken as a reference point of the disk space, the start point of the area C is represented by [P−(A+B)].

The user area C may have a logical file structure (e.g., FIGS. 3 and 4) having a hierarchical arrangement of files such as a directory (C-1), files (C-2), (C-3), (C-4) and (C-5). As shown in FIG. 3, for example, a root directory (C-1) may be a table recording the number of subdirectories and files (F-C) under directory management, a recording range (a recording size S1, a recording start position P1) of a table (C-2 to be described below) relating to the subdirectories and files, and the like. The file (C-2) may be a table recording a directory name (D-N), a file name (F-N) and a recording range (a recording size S2 or S3, a recording start position P2 or P3) of file/directory management information, and the like. The file (C-3; pointed to by S3, P3) may be a table recording a recording range (a recording size S4-1-X, a recording start position P4-1-X) of file data, and in case of recording in a plurality of recording ranges, a recording range (a recording size S4-2-X, a recording start position P4-2-X) of information N4-X indicative of one of the ranges and information indicative of the next recording range in another file (C-3; pointed to by S4-2-1, P4-2-1). The files (C4) may be areas recording compressed data. The file (C-5) information shown in FIG. 4 may be a table managing recording statuses of sectors (recorded or unrecorded) in the user area.

The logical file structure of the user area C described in FIG. 3 corresponds to a physical file as shown in FIG. 4. The logical file structure of the user area C may correspond to, i.e., be divided into, a group of recording units in FIG. 4, such as sectors. The sectors may in turn have correspondence to the bitmap table (C-5) where each individual bit corresponds to a different sector, and bitmap bits having a value (1) written therein are indicative that data is written into a corresponding sector on the recording medium, while bits having a value (0) written therein are indicative that data is not written into a corresponding sector. A copy of the bitmap table (C-5) may be written in a predetermined location in the user area C, with such medium-resident copy having an advantage in that it is an integral part of the recording medium, and thus is always available wherever the recording medium is loaded and whenever the recording medium is used. Another copy of the bitmap table (C-5) may be temporarily stored within the non-volatile memory 4, such non-volatile memory-resident copy having the advantages that it can be very quickly/periodically accessed/changed by the PU 5 during an ongoing write operation of file data from the buffer RAM 3 to the recording medium, i.e., the non-volatile memory 4 has a much quicker access time that the above discussed recording head-move from file data area to management data area, and thus may be able to be conducted together (i.e., intermittently) with the file data recording without suffering any file (e.g., image) data loss. Accordingly, the non-volatile memory-resident bitmap table (C-5) copy stored within the non-volatile memory 4 may serve to provide useful/reliable recovery information if the data recording arrangement 1 experiences a fault (e.g., power outage, mechanical shock, vibration) during a writing operation.

The realtime data recording method for recording data as a readable file will be described, such method being applicable to the FIGS. 1–4 described arrangements. First, the recording medium used in the recording apparatus may have a file (e.g., video) data area, a file management area and a bitmap available-area management table (C-5) thereon. If the three medium-resident data areas are reliably updated during a normal uninterrupted operation, the recording medium has reliable data thereon and recorded data can be read, reproduced and used in any recording apparatus. If however, the writing or updating operation is abnormally or prematurely interrupted (e.g., via a power outage, mechanical shock to the apparatus, vibration, or other disturbance of the data recording arrangement) before all the data areas can be reliably updated, the recording medium may have faulted or un-updated data, i.e., medium-resident file data which does not match medium-resident management data.

More particularly, as one example using FIG. 1, when video data is passed through the moving image & audio input unit 7 and the compression unit 8 and is then written on the recording medium 1, some disturbance may occur so as to cause another file area and the bitmap available-area management table not to be correspondingly updated on the recording medium. If the medium-resident management data is not updated to reflect video data which has already been written, video data corresponding to the non-updated areas cannot be reproduced reliably, i.e., unless special arrangements are made.

Accordingly, discussion now turns to an example of special arrangements made by the present invention, which arrangements allow recovered use of recorded data even in the event of a disturbance which prevented/disturbed management data updating. First, prior to beginning of a recording operation, an available (i.e., pre-existing) area management table on the recording disk is read, and a recordable range (e.g., maximum recordable range) on the recording disk is determined. Then, the files (C-2) and (C-3) of a file to be recorded are generated such that the above recordable range is set as the recording range, and information reflecting such range is recorded on the recording disk. Thereafter, while video data is being recorded in a file data area, writing cannot be performed on the medium-resident management table due to above-discussed physical and processing limitations, and accordingly, the medium-resident management table remains unchanged during file data recording.

In contrast, the non-volatile memory 4's copy of the bitmap table (C-5) containing information about the recording medium's sector recording as shown in FIG. 4, is updated in parallel to (i.e., intermittently with) the recording of the video data on the recording medium. The storage into the non-volatile memory 4 is performed by the PU 5 in accordance with the program in the system program unit 6, at predetermined intervals in the recording of file data, e.g., using the buffer RAM 3. As contrasting criteria, the predetermined intervals may be set sufficiently small to allow sufficiently prompt updatings of management data so as to minimize an amount of recorded file data which would be lost if an apparatus interruption were to occur, yet may be set sufficiently large (i.e., not occur too often) so as not to interfere with intensive processing/timings necessary for file data recording (i.e., so as not to cause file data loss). The exact value of the predetermined intervals to balance the above-discussed contrasting criteria may be determined according to the specific parameters (e.g., processor speed, FIFO buffer size, recording medium access time, etc.) of each specific implementation.

Discussion now turns to FIG. 6 which is directed to an example recording operation flowchart 600 according to one example embodiment of the present invention. More particularly, attention is directed to the recording operation flowchart 600 of FIG. 6, wherein after a start block 602, flow moves to a block 604 to set a recording status F-B of the recording medium (or apparatus) to a write status (for example, a predetermined writing status bit on the recording medium may be set to a first logical value (e.g ., a logical "1") to indicate that the recording medium has been set to begin a writing operation). Flow then moves to a block 606 where initial or temporary management data may be written to the recording medium. Next, flow moves to a block 608 where a predetermined amount of sectors of file data are recorded onto a recording medium. At a block 610, the non-volatile memory 4's copy of the bitmap table (C-5) is updated (e.g., at the interval of recording of every 3 sectors). Note that because the non-volatile memory 4's copy of the bitmap table (C-5) has been selected in this example embodiment to be updated at an interval of every 3 sectors, such means that a maximum of only 3 sectors of recorded file data can be lost upon occurrence of a fault of the recording apparatus. In addition to updating of the non-volatile memory-resident copy of the bitmap table (C-5), an embodiment can also be configured to also store a copy of any additional management data within the non-volatile memory 4, a non-exhaustive listing of such data including: a copy of the recording status indicator; a copy of data concerning the FIG. 3 hierarchical file structure of the recording medium's disk space; if newly-recorded recording medium sectors are not recorded in a predetermined or known sequence of sectors, a copy of linking data defining how newly recorded recording medium sectors are linked in sector chain.

At a block 612, It is determined whether recording of file data onto the recording medium has been finished. If not, flow moves through loop 614 and again through blocks 608 and 610 to conduct additional recording of file data and updating of the bitmap table. Once it is determined within block 612 that recording of file data has been finished, flow moves to a block 616 where permanent management data is updated/recorded onto the recording medium, including an updating of the recording medium's copy of the bitmap table (C-5). Flow then moves to block 618 to reset a recording status F-B of the recording medium (or apparatus) to non-write (for example, a predetermined writing status bit may be set to a second logical value (e.g., a logical "0") to indicate that the recording medium has been set to a non-writing status), and the flow is ended at an end block 620.

In the above recording method, for example, if a disturbance (e.g., a fault of power loss, mechanical shock, vibration) occurs in the apparatus before the blocks 616 or 618 are performed, file management data on the recording medium will not have been updated to match the file data which have been newly written, and accordingly, the recording medium's file management information and file data will be mismatched. Data and/or system error may occur if reading of the recording medium is attempted. However, the useful information within the non-volatile memory 4 is advantageous in that it can be used to reconstruct some management data and thus recover use of substantially most (if not all) of the recorded file data. More particularly, after occurrence of a fault, the bitmap table (C-5) sector information or any other type of management data stored in the non-volatile memory 4 and the bitmap available-area management table (C-5) or appropriate areas on the recording disk may be compared or otherwise used, and such information can be used to reconstruct/recover management data with respect to a mainstay of the recorded file data. As one example, as the non-volatile memory 4's bitmap available-area management table and/or any other management data corresponds to the hierarchical file structure in the disk space in FIG. 3, most (if not all) of the recorded logical hierarchical portion recorded onto the disk can be known. Accordingly, even if an apparatus fault occurs during data recording, the position of recorded data can be obtained, and the data can be reconstructed/recovered as a readable file.

FIG. 7 is directed to an example recovery operation flowchart 700 according to one example embodiment of the present invention. After a start block 702, flow moves to a block 704 to obtain a recording status F-B of the recording medium (or apparatus), and such information is used in block 706 to determine whether the recording medium (or apparatus) has indeed been set to a writing status, i.e., is "open". If not open, such is indicative that the recording medium (or apparatus) has not suffered a fault during recording/updating, and flow moves along path 708 and directly to an end block 720. If the status is open, flow moves to block 710 where a user is polled (e.g., via a display prompt) as to whether recovery should be conducted, and the user's answer is then utilized in a decision block 712. If in block 712, the user's answer indicates that recovery has not been requested, flow moves along path 714 and directly to an end block 720. In this situation, as a fault has occurred during recording, and recovery has not yet been performed, mismatched management data and file data remains on the recording medium, and system and/or data errors may occur if reading/reproduction is attempted with the faulted recording medium.

At this point, it is also useful to note that if recovery is not performed and the recording medium is removed from the recording apparatus, the non-volatile memory 4's useful bitmap table (C-5) may become disassociated with the faulted recording medium, and may make it impossible to perform recovery. As one way to avoid this disassociation problem, the non-volatile memory 4's useful bitmap table (C-5) may be first stored onto the recording medium before recording medium removal is allowed, so as to remain associated with the faulted recording medium and remain available for use in a later recovery attempt. As another way, the useful bitmap table (C-5) may remain stored indefinitely within the non-volatile memory 4 of the recording apparatus together with further identification information (e.g., a recording medium label, serial number, password), again so as to remain associated with the faulted recording medium and remain available for use in a later recovery attempt when the faulted recording medium is again reinserted into the apparatus. Upon recording medium reinsertion, the identification information of the recording medium may be retrieved from a direct reading of such information from the recording medium, or polling of a user may be conducted to require a user to manually input such identification information.

Once it is determined within block 712 that recovery has been requested, flow moves to a block 716 where non-volatile memory 4's bitmap table (reflecting a most reliable count indication of sectors which have been recorded) or any other type of management data temporarily stored, is used in comparison against a file size and/or file entry of the recording medium to confirm mismatched management data and file data on the recording medium, and/or to reconstruct suitable management data which should be written to/updated to the recording medium. Next, flow moves to block 718 where permanent management data (determined in block 716) is updated/recorded onto the recording medium, including an updating of the recording medium's copy of the bitmap table (C-5) and resetting of the recording status back to non-writing. Flow then moves to a block 720 where the flow is ended.

One example of recovery/updating can be given as follows. As described above, a file is first defined with the file name F-N, the file size S, and the recording start position P. A file No. is written into the file management area in advance, and available bits from the recording start position P to a position S1 are reserved. If system fault occurs at a differing position S2, the position S2 is read from the memory, and available-area management table is sequentially examined, to correct the available bits as S1–S2.

In the above example, the sector information recorded in parallel with the data recording is held in a battery-backup possible memory, however, the present invention is not limited to the such example. The management data of directories and files and user-area recording status data may be held in a non-battery type, non-volatile memory, e.g., a hard drive.

Further, if a different recording medium is loaded when restarting the apparatus, an ID number may be previously stored and utilized to associate a fault and non-volatile memory bitmap table (C-5) with a particular disk, and the apparatus can be constructed to recognize that an incorrect disk is loaded immediately following a recording fault. A message indicative of occurrence of fault, advising a user to exchange the disk or asking whether or not the memory information should be deleted may be outputted. Further, it may be arranged such that a message to notify the occurrence of fault is provided to the user, so that the user can determine whether to delete the file recorded thus far upon the occurrence of the fault, or whether to restore the file.

As described in detail above, the construction of the present invention can provide a realtime data recording method which records data, and wherein file data recorded upon occurrence of a mechanical or other apparatus fault during data recording (e.g., in a camcorder recording system), can be substantially recovered as a readable file.

This concludes the description of the preferred embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A real-time data recording method for recording data in a real-time manner on a random-accessible data recording medium, comprising:

before recording of file data, generating initial management data for said file data to be recorded, then recording said initial management data on said data recording medium, and recording said file data on said data recording medium;

during the recording of said file data on said data recording medium, at least intermittently generating real-time management data corresponding substantially to a real-time file data recorded on said data recording medium, and recording said real-time management data in a non-volatile recording medium; and upon restarting a use of said data recording medium after occurrence of a fault, reading said initial management data, and reading said real-time management data from said non-volatile recording medium to update said initial management data and updating said initial management data, and recording said updated management data onto said data recording medium;

wherein if a different said data recording medium is loaded when restarting the apparatus, a message indicative of occurrence of fault, and at least one of advising a user to exchange said data recording medium, and asking whether or not information in said non-volatile recording medium should be deleted, is outputted.

2. A real-time data recording method for recording data in a real-time manner on a random-accessible data recording medium, comprising:

before recording of file data, generating initial management data for said file data to be recorded, then recording said initial management data on said data recording medium, and recording said file data on said data recording medium;

during the recording of said file data on said data recording medium, at least intermittently generating real-time management data corresponding substantially to a real-time file data recorded on said data recording medium, and recording said real-time management data in a non-volatile recording medium; and upon restarting a use of said data recording medium after occurrence of a fault, reading said initial management data, and reading said real-time management data from said non-volatile recording medium to update said initial management data and updating said initial management data, and recording said updated management data onto said data recording medium;

wherein a message indicative of occurrence of said fault is provided to a user, so as to poll a user as to whether to delete said file data recorded prior to said fault or to use said real-time management data to generate said updated management data and record said updated management data onto said data recording medium.

3. A real-time data recording apparatus for recording data in a real-time manner on a random-accessible data recording medium, comprising:

an initial management data generator/recorder to generate, before recording of file data, initial management data for said file data to be recorded, then to record said initial management data on said data recording medium, and to record said file data on said data recording medium;

a real-time management data generator/recorder to at least intermittently generate, during the recording of said file data on said data recording medium, real-time management data corresponding substantially to a real-time said file data recorded on said data recording medium, and to record said real-time management data in a non-volatile recording medium; and a fault detector/recoverer to operate upon restarting a use of said data recording medium after occurrence of a fault, to read said initial management data, and to read said real-time management data from said non-volatile recording medium to update said initial management data, and to record said updated management data onto said data recording medium;

wherein if a different said data recording medium is loaded when restarting the apparatus, said fault detector/recoverer is adapted to effect a message indicative of occurrence of a fault, and at least one of a message advising a user to exchange said data recording medium and a message asking whether or not information in said non-volatile recording medium should be deleted.

4. A real-time data recording apparatus as claimed in claim 3, wherein said fault detector/recoverer is adapted such that a message indicative of occurrence of said fault is provided to a user by said fault detector/recoverer so as to poll a user as to whether to delete said file data recorded prior to said fault or to use said real-time management data to generate said updated management data and record said updated management data onto said data recording medium.

* * * * *